Patented May 16, 1950

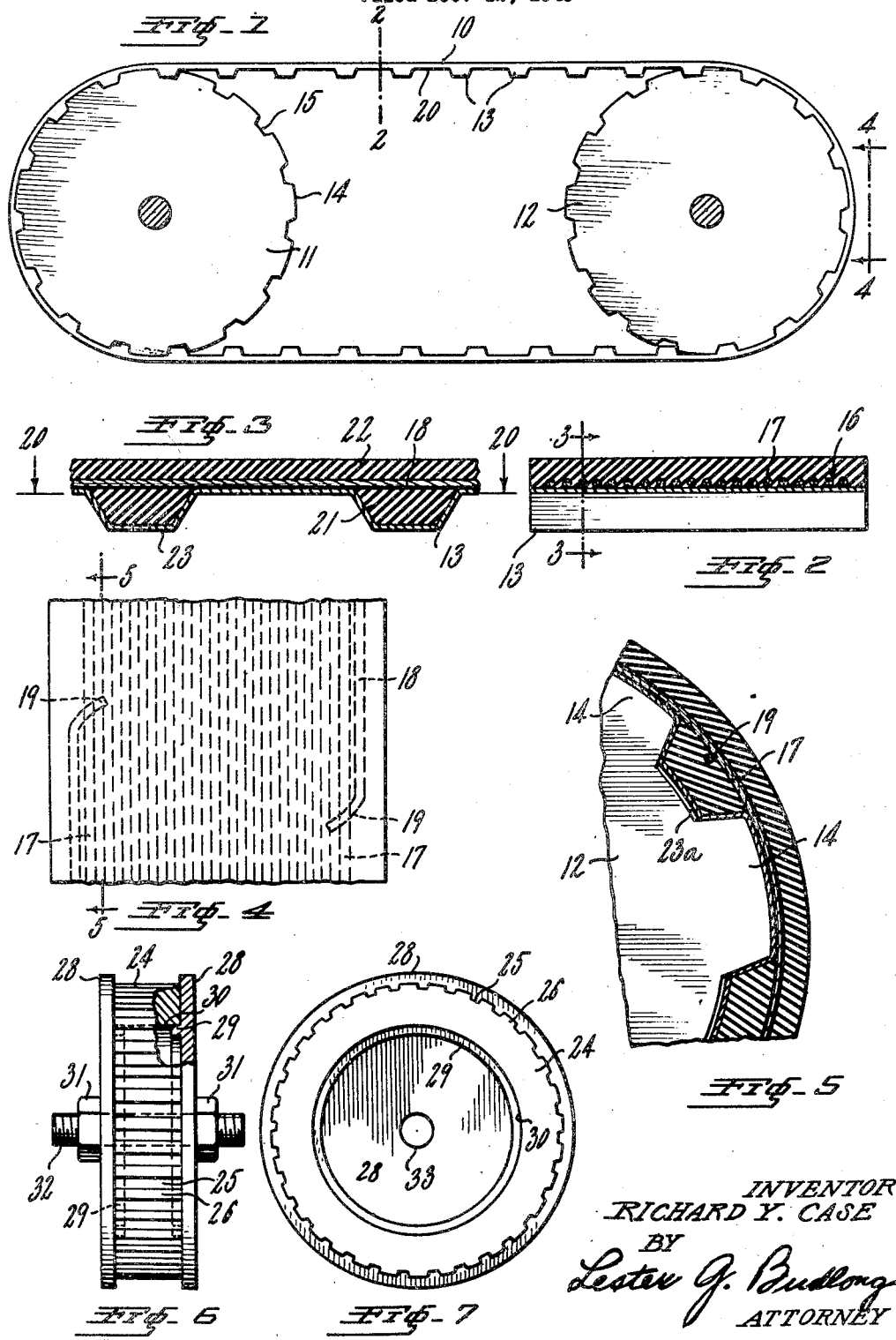

2,507,852

UNITED STATES PATENT OFFICE 2,507,852

TRANSMISSION BELT AND DRIVE

Richard Y. Case, Philadelphia, Pa., assignor to United States Rubber Company, New York, N. Y., a corporation of New Jersey Application December 12, 1945, Serial No. 634,416

9 Claims. (Cl. 74—237)

1

This invention relates to a belt and gear drive and a belt therefor having resilient teeth adapted to mesh with precision with the teeth or spaces therebetween of two or more gears.

The transmission of power by belts is desirable in some fields because they can be operated at relatively high speeds with less noise and without transmitting as much vibratory movement to supporting objects as gears or sprocket chains operating on other gears. However, belt transmissions of the common type heretofore used, having smooth surfaces adapted to operate on the smooth surfaces of pulleys have the disadvantage of slipping or creeping on the pulley faces, which action eliminates the use of the belt as a timing belt for maintaining a constant ratio of R. P. M. between the driving and driven pulleys. The slippage also decreases the life of the belt due to wear. Such belt transmissions have the further disadvantage of requiring an initial tension to be imposed on the belt which decreases the effective strength of the belt for transmitting power and also increases the load on the pulley bearings, which in turn decreases their life due to wear and results in a loss of power.

It has been proposed to provide belts with fluted soft rubber driving surfaces to run on a correspondingly fluted rubber surface of a pulley face for the purpose of producing a more positive and silent drive as shown in United States Patent No. 450,999. It has also been proposed to provide belts with rubber gear teeth for meshing with the teeth of a gear as shown in United States Patent No. 2,182,461. These prior constructions were not satisfactory, because the strain resisting members adapted to pull the load were too stretchable under operating conditions and they were not properly positioned in respect to the base of the teeth to cause the flutes or teeth on the belts to accurately mesh with the flutes or teeth on the wheels. Furthermore the off set between the line of pull on such strain resisting members and the bottom of the working depth of the teeth on the belt would have caused the intermeshing teeth to bind and become wedged between one another even though such teeth should become meshed.

In accordance with this invention a high speed, silent, positively geared power transmission belt is produced by providing the belt with soft resilient teeth which are bonded to a thin strain resisting member having one surface located substantially at the dedendum line of the teeth and which is substantially inextensible under the working loads of the belt for which it is designed.

2

The term "thin" as used above in respect to the strain resisting member means that the thickness is insufficient to cause the belt to be unduly stiff or to cause a change in the pitch of the teeth when the belt passes around a gear. Dedendum line as used herein in respect to the belt teeth is the line which marks the bottom of the whole depth of the teeth. In this belt construction the power is transmitted silently because of the resiliency of the belt teeth, although the belt is operated at high speeds on hard toothed gears, such as steel, having an unyielding surface. Also, accurate meshing of the belt teeth with the gear wheel teeth is obtained, because the strain resisting member is substantially inextensible under loaded conditions and it is located substantially on the dedendum line and is solidly supported by the ends of the gear wheel teeth on their addendum circle. The teeth can be made to mesh so accurately that backlash is eliminated but this is not essential, except where the belt is used as a timing belt.

This invention is further described in reference to the accompanying drawings, in which:

Fig. 1 is a side, or edge, elevational view of the belt embodying this invention, and shown in engagement with its cooperating gears;

Fig. 2 is an enlarged transverse cross-sectional view of the belt taken on line 2—2 of Fig. 1;

Fig. 3 is a longitudinal cross sectional view of the belt taken on line 3—3 of Fig. 2;

Fig. 4 is an enlarged plan view of the outside face of the belt looking in the direction of the arrows 4—4 in Fig. 1;

Fig. 5 is a cross sectional view through the belt and a section of the gear engaged therewith; and Figs. 6 and 7 are respectively assembled and partially assembled views of the mold in which the belt may be made and drawn on a reduced scale with parts broken away in Fig. 6.

The belt 10 embodying this invention is shown in Fig. 1 in engagement with driving and driven gear wheels 11 and 12. The belt 10 is provided with teeth 13 which accurately mesh with the teeth 14 on the gears 11 and 12 as shown in Fig. 5. That is, the teeth 13 fit accurately within the spaces 15 between the teeth 14 on the gears, or the width of the teeth 13 may be slightly less than the distance between the teeth 14 as desired. The belt 10 is endless, and as shown in Figs. 2, 3, 4 and 5, it is provided with a strain resisting member 16 comprising a plurality of turns 17 of a continuous strand 18, preferably of high tensile strength wire, which is composed of a number of round twisted or flat braided strands. The strain resisting member 16 carries substantially the entire working load imposed upon the belt 10, and under the maximum load for which the belt is designed, the member 16 is substantially inextensible. The turns 17 are helically wound around the belt in a single layer which lies substantially on the dedendum line 20 of the belt teeth 13. The ends 19 of the first and last turns of the strand 18 are tied in with the adjacent turn 17 by placing them under the adjacent turn 17 and one or more of the other turns as may be necessary to securely retain the ends of the strand in position. As an alternative the outer edge or marginal turns 17 may be soldered or otherwise secured to the adjacent turns.

The strain resisting member should be placed as close to the dedendum circle as possible to obtain the best meshing of the teeth. It has been found that for a belt having a tooth pitch of .750 in., a strip of duck .008 in. thick may be placed between the dedendum circle and the strain resisting member when run on a pulley of one inch in diameter. Such thickness between the strain resisting members and the dedendum circle may be varied from this to some extent. It may be increased to a greater extent when the belt is run on larger pulleys. In any event the distance between the dedendum circle and the strain resistance members should not be great enough to substantially change the pitch of the belt teeth while passing around the gears in the arcs where they move into and out of mesh with the gear wheel teeth.

A strain resisting member having some initial extensibility may be used. If the initial extensibility exceeds an amount which would cause an increase in the pitch of the teeth 13 on the belt under its operating load, the teeth 13 must be originally formed with less pitch than the teeth of the gears with which they are to mesh. Afterwards a sufficient part of the initial extensibility must be removed to make the pitch of the teeth 13 equal to the pitch of the gear teeth 14, and to prevent the belt from subsequently stretching under operating load and thereby change the pitch. The initial extensibility is removed to the required extent by placing the belt under initial tension between the gears. As in the case of prior belts this initial tension is objectionable for the reasons heretofore referred to, but in some cases is permissible for obtaining a quiet timing gear, where a loss in effective strength of the belt under load and increased load on the gear bearings are not critical factors. In order to avoid placing an initial tension on the belt in addition to the tension produced by the power load, it is desirable to use a strain resisting member having an ultimate elongation of not more than 3%.

As shown in Fig. 3, the main body of the teeth 13 are made of a resilient composition 21, such as a composition of vulcanized solid soft rubber, which may be either natural or synthetic, or other rubber like material. A layer 22 of soft resilient material, such as soft vulcanized rubber, covers outer face of the belt 10. The soft resilient body 21 of the teeth 13 and the layer 22 penetrate the interstices between the turns 17 and are bonded together as well as to the turns 17 of the strain resisting member 16. The inner face of the belt is covered with a resin treated or rubberized fabric 23, which defines the outline of the teeth 13 and the dedendum line 20 extending therebetween. The resin used to impregnate the fabric 23 is compatible with and is preferably of the same type as that used in the teeth 13. The fabric 23 is securely bonded to the resilient material 21 of the teeth 13 and to the layer of material 22 which penetrates the interstices in the strain resisting member 16, and the fabric lies adjacent to such member. The fabric 23 forms a wear resisting surface for the inner face of the belt and the surface has less frictional drag than if the rubber were not covered.

As shown in Fig. 5, the teeth 13 accurately fit the spaces 15 between the teeth 14 on the gears, and thereby eliminate all back-lash between the belt and the gears. Preferably some clearance 23a is provided between the outer ends of the teeth 13 and the circle marking the whole depth of teeth 14. It is important that the bases of the teeth 13 at their dedendum line 20 make contact with and be supported by the gear teeth 14 in order to prevent the teeth 13 from bending and becoming wedged between the teeth 14. The teeth 14 preferably have a hard surface, which may be made of steel or other hard material. In such case the strain resisting member 16 is solidly supported by the ends of the gear teeth 14 at their addendum circle, because the inextensible strain resisting member lies substantially on the relatively thin fabric 23, and there is substantially no flowable material between the member 16 and the hard supporting teeth. The solid support eliminates back-lash or an increase in the tooth pitch of the belt, because it prevents the belt from being reduced in thickness over the teeth 14 and causing slack in one reach due to the tension in the other reach resulting from the power load. Since the strain resisting member 16 is substantially inextensible under working loads, and it has a solid bearing on the ends of the gears 14, this insures that the teeth 13 will properly mesh with the teeth 14 of the gears when under loaded conditions.

The belt 10 is molded, and it may be made upon a circular mold as shown in Figs. 6 and 7. Fig. 6 is an elevational view of the assembled mold showing the lengthwise axis, and Fig. 7 is an end view of the mold with one of the end plates removed. The mold comprises a collapsible or breakable center ring 24, the periphery of which has transverse grooves 25 therein of the shape of the teeth 13 to be formed on the belt 10, and the teeth 26 between the grooves 25 produce the space between the teeth 13 on the belt. The teeth 26 correspond to the teeth 14 of the gears on which the belt 10 is adapted to operate, excepting their pitch circle is larger and their whole depth may be less than that of the teeth 14. The ring 24 may be made of clay or other breakable material, or it may be made in sections so that it can be separated from the belt to be molded thereon. The parts of the mold are held together between two end plates 28 which are provided with ribs 29 extending into the inner periphery 30 of the ring 24 for holding the parts in the proper circular relationship. The plates are clamped together between two nuts 31 which are threaded on a shaft 32 extending through a bore 33 in the plates and gear molding ring 24.

In building the belt on the assembled mold as shown in Fig. 6, a coat of rubber cement is applied to the mold cavity formed between the plates 28 and allowed to dry thoroughly. A strip of light weight bias cut fabric impregnated with a rubber cement is applied under tension to the surfaces of the grooves 25 and teeth 26 of the mold ring 24. The fabric strip forms the inner face 23 of the belt 10, and in lieu of rubber cement, it may be impregnated with other suitable resins. The unfilled spaces above the fabric 23 in the grooves 25 are then filled with an unvulcanized plasticized rubber compound which forms the body 21 of the belt teeth. The strain resisting member 16 is then built up on the mold by helically winding a plurality of turns of the strand 18 around the outer ends of the teeth 26. In order to secure the ends 19 of the first and last turns 17, they are extended underneath one or more of the adjacent turns 17 as shown in Figs. 4 and 5. The strand 18 is preferably made of stranded brass plated steel wire. The plating is applied in order to secure a better bond between the rubber and the wire. The strands of the wire may be either twisted as in a rope, or braided into a flat braid. The following is a specification of a suitable wire of either type:

|  | Wire Rope | Flat Braid |
|---|---|---|
| Construction | 7 x 3 x .0058" | 9 x 2 x .0058". |
| Fabrication | Stranded | Braided. |
| Size | .036" dia. | .073" wide x .015" thick. |
| Tensile, Minimum | 165 lbs | 145 lbs. |
| Ultimate Elongation | 2.4% | 2.1%. |

The first and last turns of the strand 18 are placed a sufficient distance from the edge of the belt to be bonded in the carcass and to be protected by the outer soft resilient layer 22 formed from a layer of vulcanizable rubber compound which is applied over the strain resisting member 16. The last layer of rubber compound applied is taped in with a wrapping of tape so as to apply pressure thereto. The belt thus molded is vulcanized under the pressure of the tape thereby converting the teeth 13 and the outer layer 22 into a soft tough resilient material such as a soft solid vulcanized rubber which is bonded together and to the strain resisting member 16. The belt is then removed from the mold by taking off the end plates 28, and breaking or otherwise collapsing the molding ring 24.

While the preferred form of this invention has been described herein more or less in detail, it will be understood that changes therein may be made without departing from the spirit of the invention or the scope of the appended claims.

Having thus described my invention, what I claim and desire to protect by Letters Patent is:

1. An endless transmission belt, comprising resilient teeth adapted to mesh without change of pitch with gear wheel teeth, a single strain resisting member adapted to carry substantially all of the working load to be imposed on said belt, said member being composed of a single layer of strands formed into a plurality of turns, the inner periphery of all of said turns of said member lying substantially on the dedendum line of said teeth, whereby change in pitch of said teeth is prevented when they move into and out of mesh with the gear wheel teeth.

2. An endless transmission belt, comprising resilient teeth adapted to mesh without change of pitch with gear wheel teeth, a single strain resisting member adapted to carry substantially the entire working load on said belt, said member being composed of a plurality of turns of a continuous strand, all of said turns of said member lying in a single layer between the outer edge turns of said strand, the side of said strain resisting member facing said belt teeth being located substantially on the dedendum line of said teeth, whereby any effective change of pitch of the belt teeth is prevented when they move into and out of mesh with the gear wheel teeth, and the bases of said teeth being bonded to said strain resisting member.

3. An endless transmission belt, comprising resilient teeth, adapted to mesh without change of pitch with gear wheel teeth, a single strain resisting member adapted to carry substantially the entire working load on said belt, said member being composed of a plurality of turns of a continuous strand, all of said turns of said member lying in a single layer between the outer edge turns of said strand, the side of said strain resisting member facing said belt teeth being located substantially on the dedendum line of said teeth, whereby any effective change of pitch of the belt teeth is prevented when they move into and out of mesh with the gear wheel teeth, a thin layer of wear resistant substantially non-flowable material adhered to said strain resisting member by a thin strata of material and forming said dedendum line of said belt teeth in the spaces between said belt teeth and covering the outer periphery of said belt teeth, the bases of said belt teeth being bonded to said strain resisting member, and the projecting surfaces of said belt teeth being bonded to said last mentioned layer.

4. An endless transmission belt comprising resilient teeth, a single strain resisting member adapted to carry substantially the entire working load on said belt, said member being composed of a plurality of turns of a continuous strand, the ends of said strand being secured at the outer edges of said member, all of said turns of said member lying in a single layer between the outer edge turns, said member having not more than 3% ultimate elongation, the side of said strain resisting member facing said teeth being located substantially on the dedendum line of said teeth, whereby any effective change of pitch of the belt teeth is prevented during their movement into and out of mesh with the cooperating gear wheel teeth, and the bases of said belt teeth being bonded to said strain resisting member.

5. An endless transmission belt comprising soft solid resilient rubber composition teeth, a single strain resisting member adapted to carry substantially the entire working load on said belt, said member being composed of a plurality of turns of a continuous length of steel wire, the ends of said strand being secured at the outer edges of said member, all of said turns of said member lying in a single layer between the outer edge turns, said wire and the number of turns being sufficiently large to produce a substantially inextensible belt under its maximum working load, said strain resisting member being located substantially on the dedendum line of said teeth, whereby any effective change of pitch of the belt teeth is prevented during their movement into and out of mesh with the cooperating gear wheel teeth, and the bases of said belt teeth being united to said strain resisting member by a vulcanized bond.

6. An endless transmission belt comprising soft solid resilient rubber composition teeth whose dedendum line is adapted to contact with the addendum line of the gear wheel teeth with which said belt teeth are adapted to mesh, a single strain resisting member adapted to carry substantially the entire working load on said belt, said member being composed of a plurality of turns of a continuous length of stranded steel wire, the ends of said wire being secured at the outer edges of said member, all of said turns of said member lying in a single layer between the outer edge turns, said wire and the number of turns being sufficiently large to produce a substantially inextensible belt under its maximum working load, said strain resisting member being located substantially on the dedendum line of said belt teeth, whereby any effective change of pitch of the belt teeth is prevented during their movement into and out of mesh with the cooperating gear wheel teeth, and the bases of said belt teeth being united to said strain resisting member by a vulcanized bond.

7. An endless transmission belt comprising rubber composition teeth, a fabric covering for said teeth which conforms to the contour thereof and extends between the teeth along the dedendum line thereof, a single strain resisting member adapted to carry substantially the entire working load on said belt, said member being composed of a plurality of turns of a continuous length of flexible high tensile strength wire, the ends of said wire being secured at the outer edges of said member, all of said turns of wire in said member between the outer edge turns lying in a single layer, said strain resisting member being located substantially on the dedendum line of said belt teeth and separated from said fabric covering by only a film of bonding material, a layer of rubber composition on the side of said strain resisting member opposite to said belt teeth, and said rubber composition layer and said belt teeth being vulcanized together and to said strain resisting member and to said fabric.

8. A belt and gear drive comprising a driving and a driven gear wheel, each having hard surfaced teeth, an endless belt having soft resilient teeth adapted to accurately mesh with the teeth of said gear wheels, said belt having a single strain resisting member adapted to carry substantially the entire working load on said belt, said member being composed of a plurality of turns of a continuous strand, all of said turns of said member lying in a single layer, the side of said strain resisting member facing said belt teeth being located substantially on the dedendum line of said belt teeth and adapted to be solidly supported on the addendum of said gear wheel teeth, and the bases of said belt teeth being bonded to said strain resisting member.

9. A belt and gear drive comprising a driving and a driven gear wheel, each having hard surfaced teeth, an endless belt having soft resilient teeth adapted to accurately mesh with the teeth of said gear wheels, said belt having a strain resisting member composed of a plurality of turns of a continuous strand lying in a single layer between the outer marginal turns of said strand, the side of said strain resisting member facing said belt teeth being located substantially on the dedendum line of said belt teeth and bonded to the bases thereof, a thin layer of flexible, substantially non-flowable wear resistant material bonded directly to the surfaces of said belt teeth and to the strain resisting member between said teeth and forming a solid support for said strain resisting member on the addendum of said gear wheel teeth.

RICHARD Y. CASE.

REFERENCES CITED

The following references are of record in the file of this patent:

UNITED STATES PATENTS

| Number | Name | Date |
|---|---|---|
| Re. 21,075 | Freedlander | May 9, 1939 |
| 556,663 | Dennison | Mar. 17, 1896 |
| 1,781,750 | Dodge et al. | Nov. 18, 1930 |
| 2,114,517 | Apel et al. | Apr. 19, 1938 |
| 2,167,384 | Freedlander | July 25, 1939 |
| 2,326,719 | Myers | Aug. 10, 1943 |
| 2,379,312 | Forrest | Mar. 26, 1946 |

FOREIGN PATENTS

| Number | Country | Date |
|---|---|---|
| 437,230 | Great Britain | Oct. 25, 1935 |
| 521,117 | Great Britain | 1939 |
| 694,161 | Germany | July 26, 1940 |